June 19, 1962     A. O. FITZNER     3,040,221
POSITIONING CONTROL APPARATUS
Filed Sept. 24, 1958     8 Sheets-Sheet 1

INVENTOR.
Arthur O. Fitzner
BY
Carlson, Pitzner, Hubbard & Wolfe
Attys

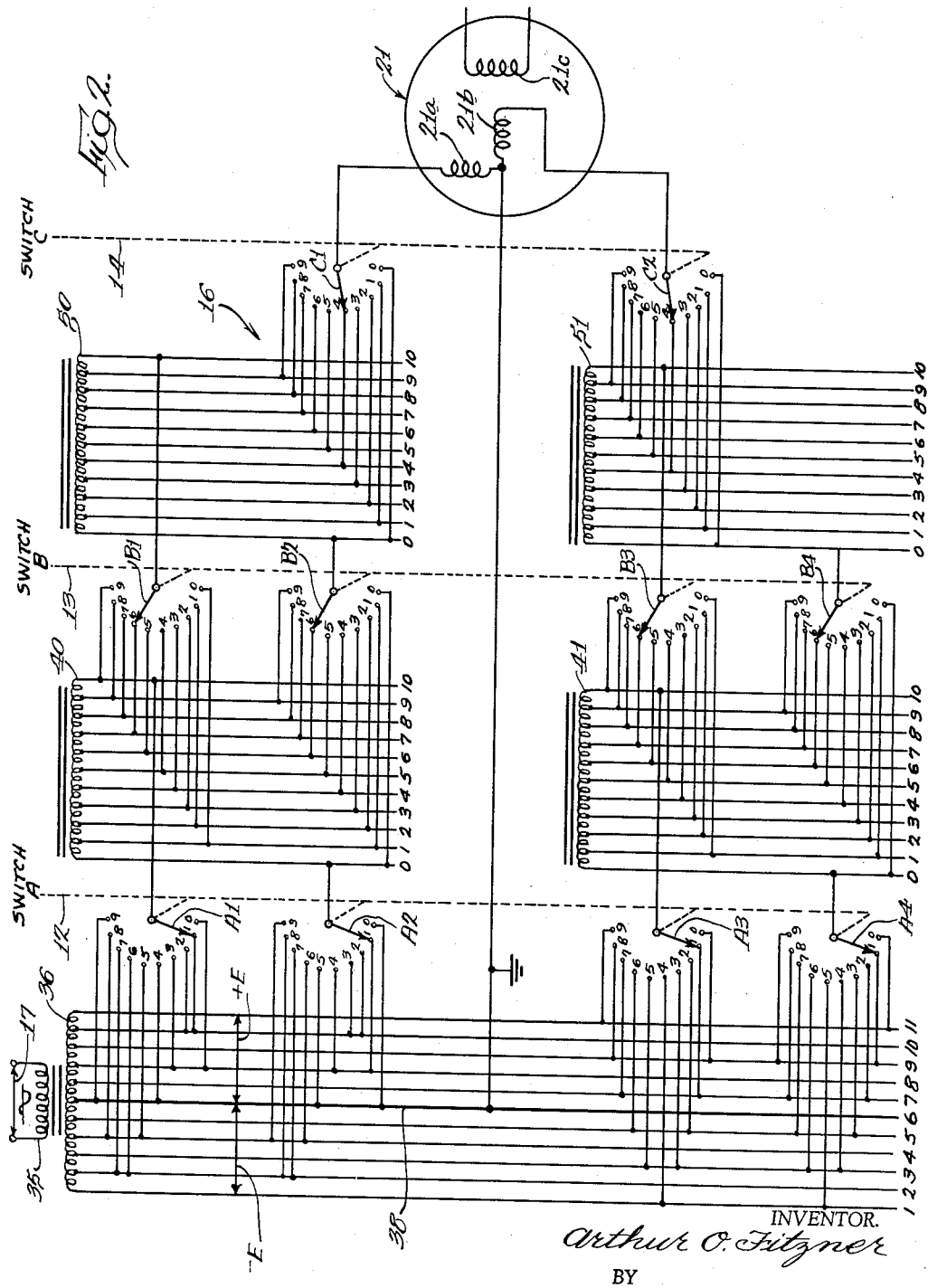

June 19, 1962 A. O. FITZNER 3,040,221
POSITIONING CONTROL APPARATUS
Filed Sept. 24, 1958 8 Sheets-Sheet 3

INVENTOR.
Arthur O. Fitzner
BY
Carlson, Pitzner, Hubbard & Wolfe
Attys.

June 19, 1962   A. O. FITZNER   3,040,221
POSITIONING CONTROL APPARATUS
Filed Sept. 24, 1958   8 Sheets-Sheet 4

Fig. 6.

INVENTOR.
Arthur O. Fitzner
BY
Carlson, Pitzner, Hubbard & Wolfe
Attys.

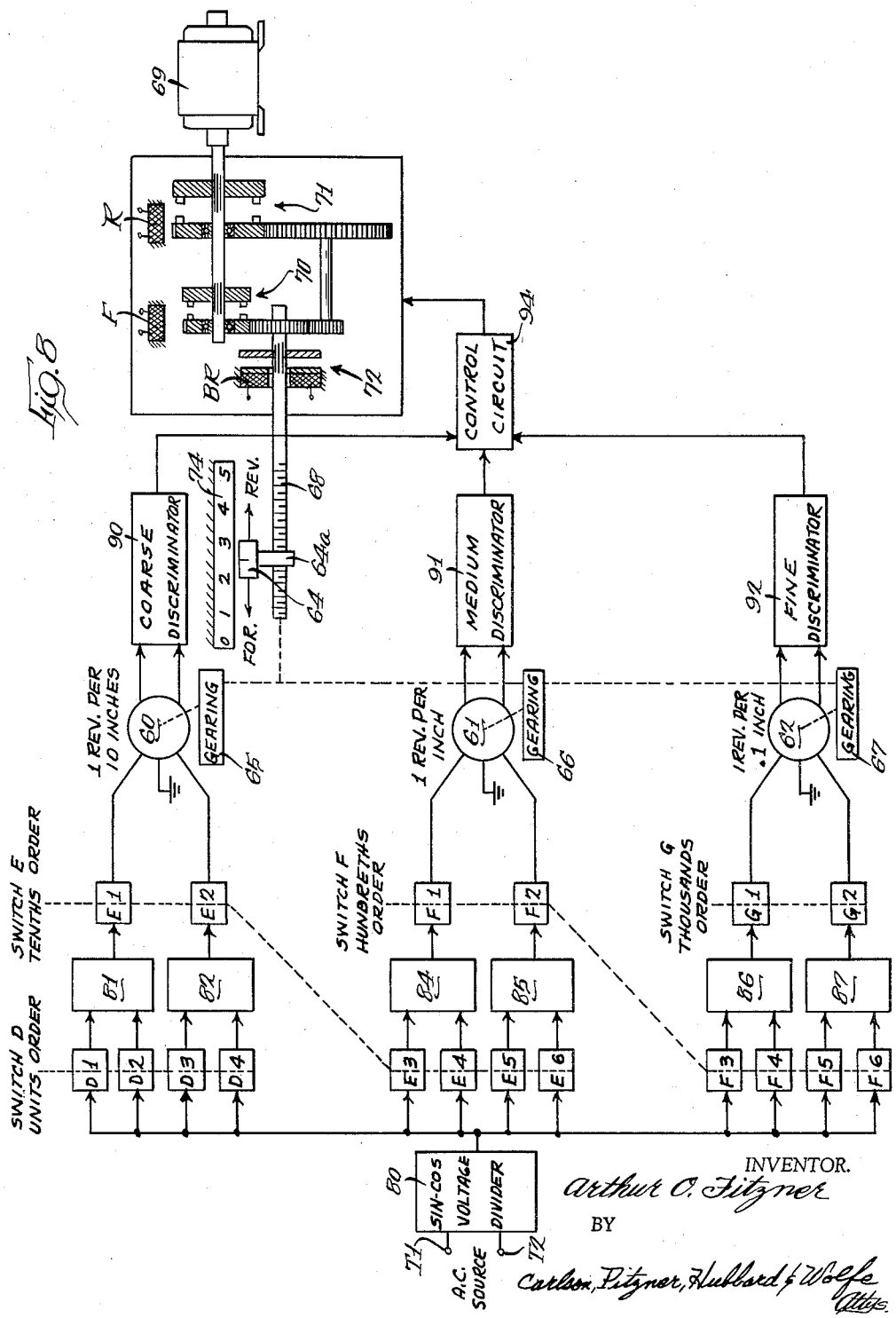

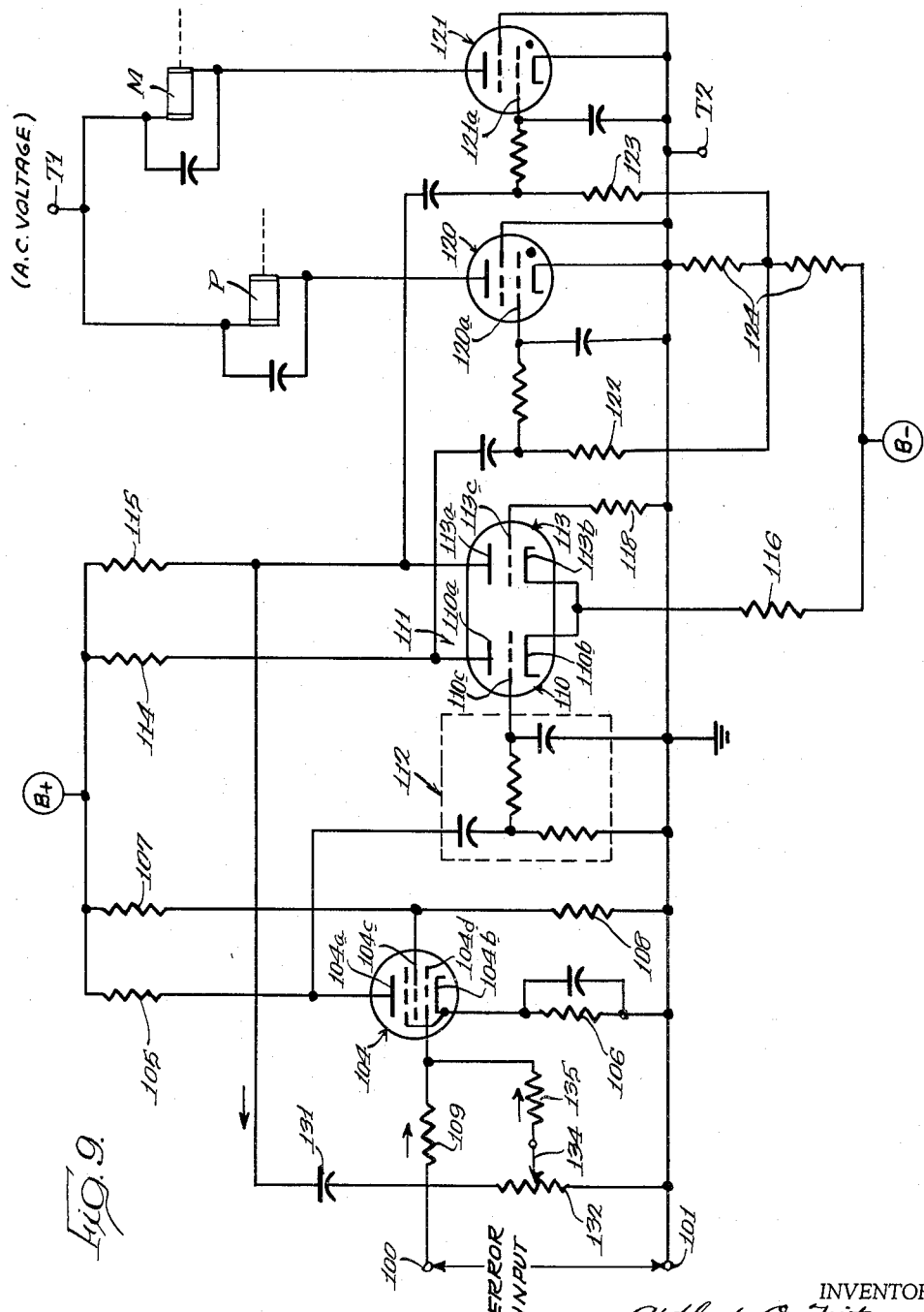

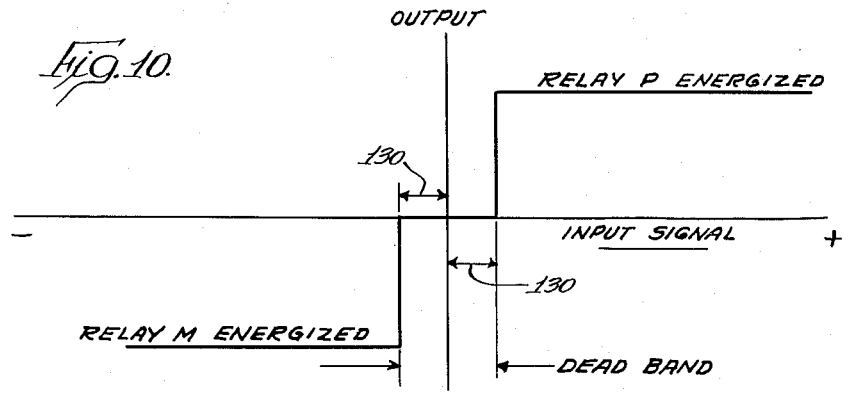
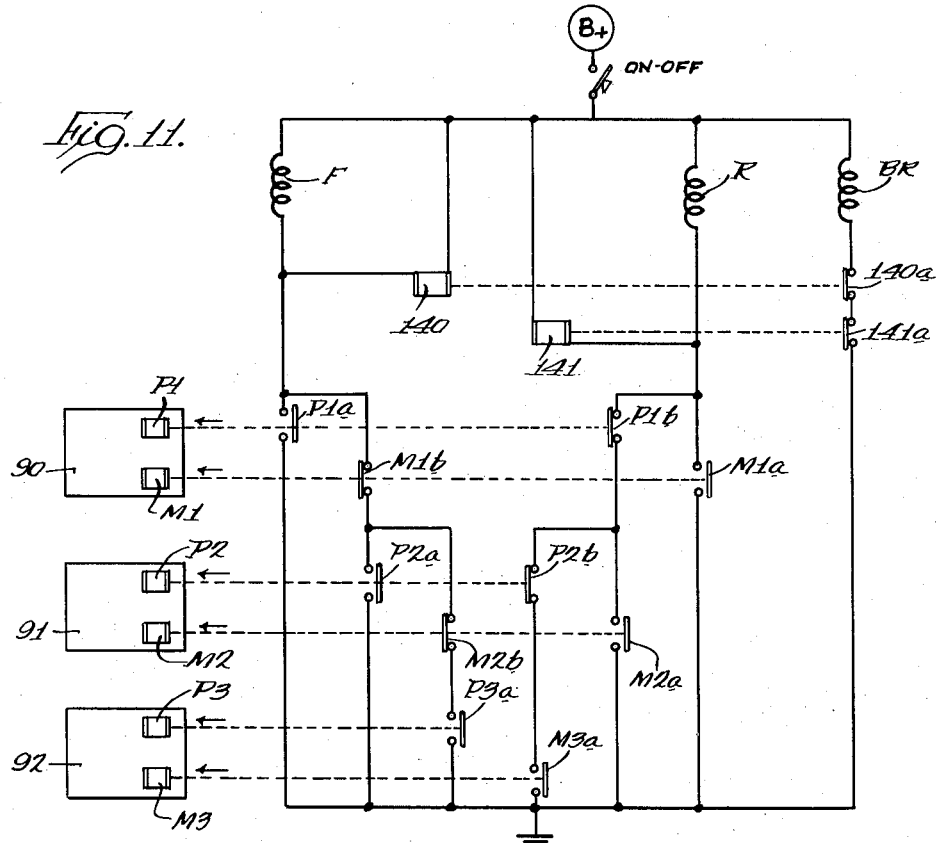

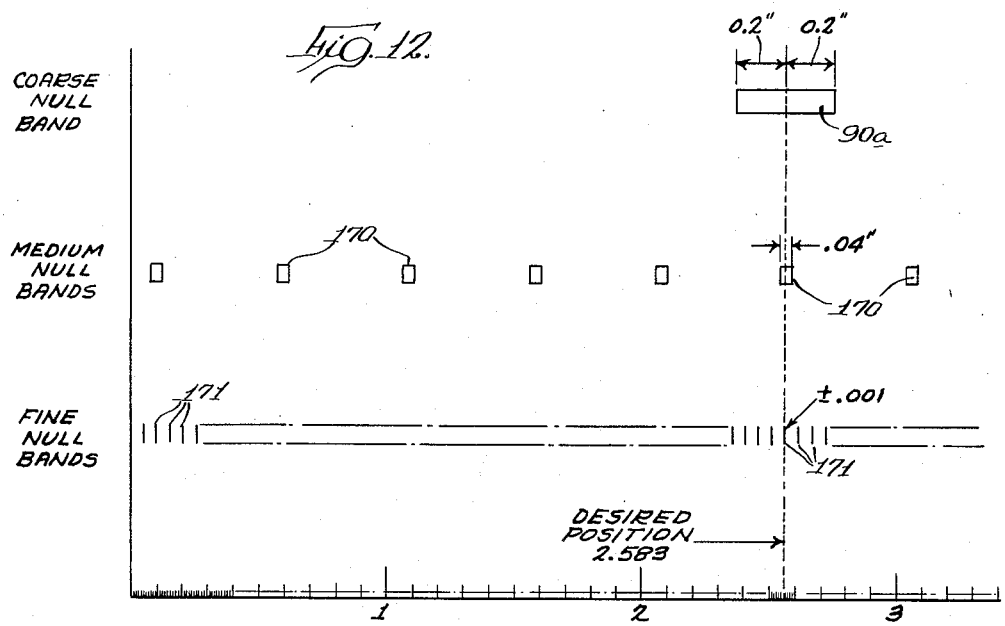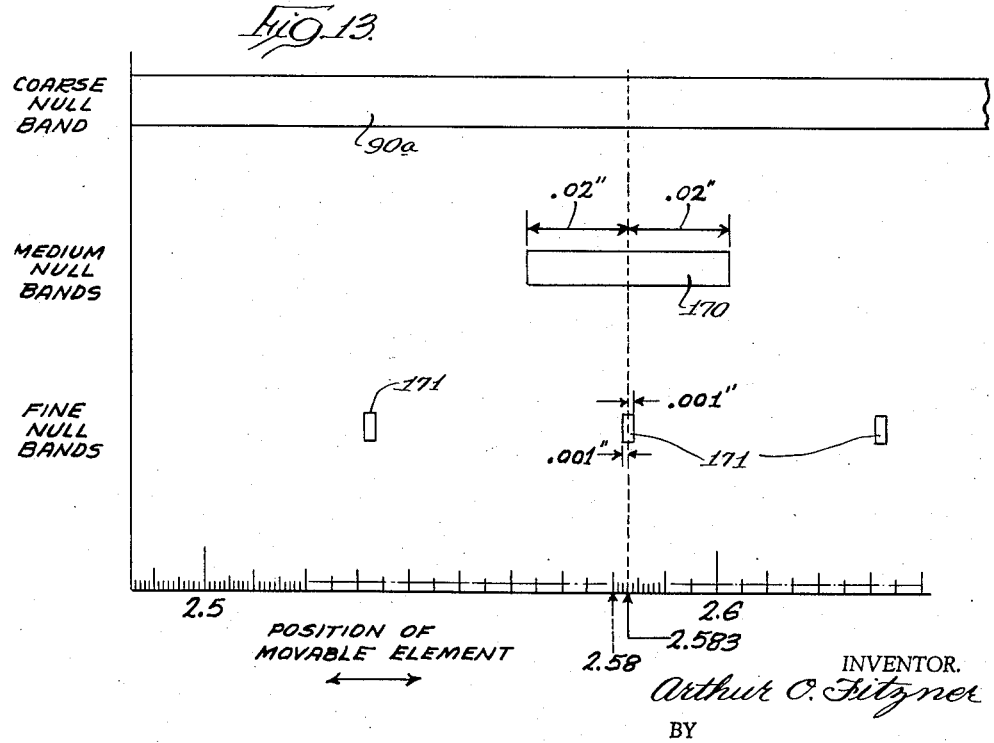

United States Patent Office 3,040,221
Patented June 19, 1962

3,040,221
POSITIONING CONTROL APPARATUS
Arthur O. Fitzner, Fond du Lac, Wis., assignor to Giddings & Lewis Machine Tool Company, Fond du Lac, Wis., a corporation of Wisconsin
Filed Sept. 24, 1958, Ser. No. 763,103
12 Claims. (Cl. 318—30)

This invention relates in general to control apparatus for positioning systems, and in particular to such systems which utilize synchro, selsyn or resolver type devices for comparing desired position information with actual position information.

The general aim of the invention is to provide improvements in positioning control apparatus by reducing in number and simplifying the organization of components which are required to position a movable element in accordance with digital, numerically defined information.

An important object of the invention is to avoid the need for complex mixing or switching circuits in systems utilizing cascaded coarse and fine synchro devices, and to enhance the reliability of operation by creating a deadband response to the individual synchro error signals.

It is another object of the invention to provide a simple and reliable deadband discriminator for use in positioning systems employing synchro devices, eliminating the need for a separate phase detector.

Still another object is to provide an improved and simplified digital-to-analog converter for exciting a synchro device with signals representing the analog of a decimal number.

Other objects and advantages will become apparent as the following description proceeds, taken in conjunction with the accompanying drawings, in which:

FIG. 2 is a schematic wiring diagram of a digital-to-analog converter embodying certain features of the invention;

FIG. 6 is a diagram illustrating the principle of interpolation and addition here employed;

FIG. 8 is a diagrammatic block-and-line illustration of a positioning system embodying the features of the invention;

FIG. 9 is a circuit diagram showing details of a deadband discriminator;

FIG. 10 is a graphic illustration of the response of the deadband discriminator;

FIG. 11 is a wiring diagram for a single control circuit governed by all of the discriminators of FIG. 8;

FIG. 12 is a graphic illustration of how the system of FIG. 8 operates as the movable element approaches a desired position defined by a decimal number; and FIG. 13 corresponds to a portion of FIG. 12 drawn to a larger scale.

While the invention has been shown and will be described in some detail with reference to a particular embodiment thereof, there is no intention that it thus be limited to such detail. On the contrary, it is intended here to cover all modifications, alternatives, and equivalents falling within the spirit and scope of the invention as defined in the appended claims.

Figure 1:
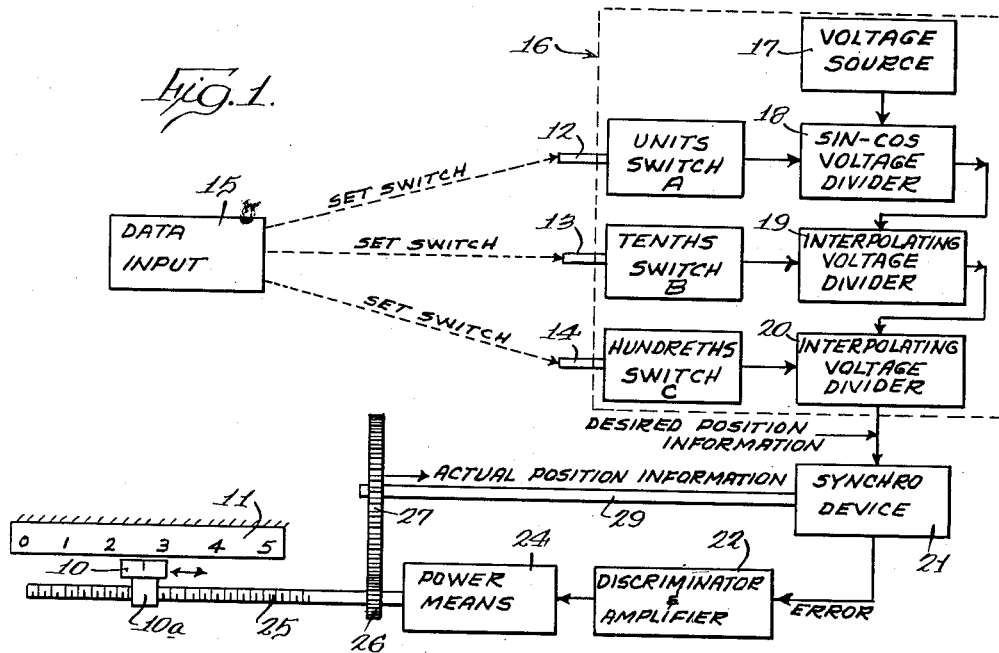
FIGURE 1 is a schematic diagram, partially in block-and-line form, illustrating an exemplary positioning system utilizing the improved digital-to-analog converter.

Referring now to FIGURE 1, the system there shown is intended to translate a movable element 10 to any desired position measured, for example, along a stationary scale 11 and originally represented by a three-place decimal number having descending order digits $a$, $b$, $c$. If it is desired to set the movable element 10 to a position of 2.54 inches, the highest order (units) digit would have the value "2," the next lower order (tenths) digit would have the value "5," and the lowest order (hundredths) digit would have the value "4." Any digit can have any of the values 0–9, inclusive.

To represent any decimal number between 0.00 and 9.99 physically electrically in digital form, a ten-state device is employed for each of the digit places. In the present instance, such devices take the form of ten-point switches A, B, C which correspond to the three digits $a$, $b$, and $c$. Shafts 12, 13 and 14, which control the setting of wipers electrically engageable with ten contacts, may be set to correspond to the values of the digits $a$, $b$, and $c$ either manually or automatically by data input apparatus 15 which may take the form of any well-known punched tape or card reader. It is sufficient here to understand only that each of the shafts 12–14 is set to one of ten angular positions corresponding to any value 0–9 for the respective digits $a$, $b$, $c$ of a decimal number.

The switches A, B, C cooperate with and control components forming a part of a digital-to-analog converter 16 which produces output signals representing in magnitude the analog of any decimal number between 0.00 and 9.99. For this purpose, the switch A is connected to control a sine-cosine voltage divider 18, while switches B and C are connected to control interpolating voltage dividers 19 and 20. The sums of the signals produced in the dividers are supplied to a synchro device 21. This device has a movable part mechanically connected to be shifted in proportion to the position of the movable element 10, and operates to provide an error signal which is proportional to the discrepancy between the desired position represented by the setting of the switches A, B, C and the actual position of the movable element 10.

The error signal is received by a discriminator 22 which controls actuation of power means 24 connected to translate the movable element 10. In the present illustration, the power means is adapted to drive a lead screw 25 having threaded engagement with a nut 10a rigidly connected to the movable element 10. Mechanical connection between the element 10 and the synchro device 21 may be effected by gears 26, 27 which drive a shaft 29 from the lead screw 25.

Figure 7:
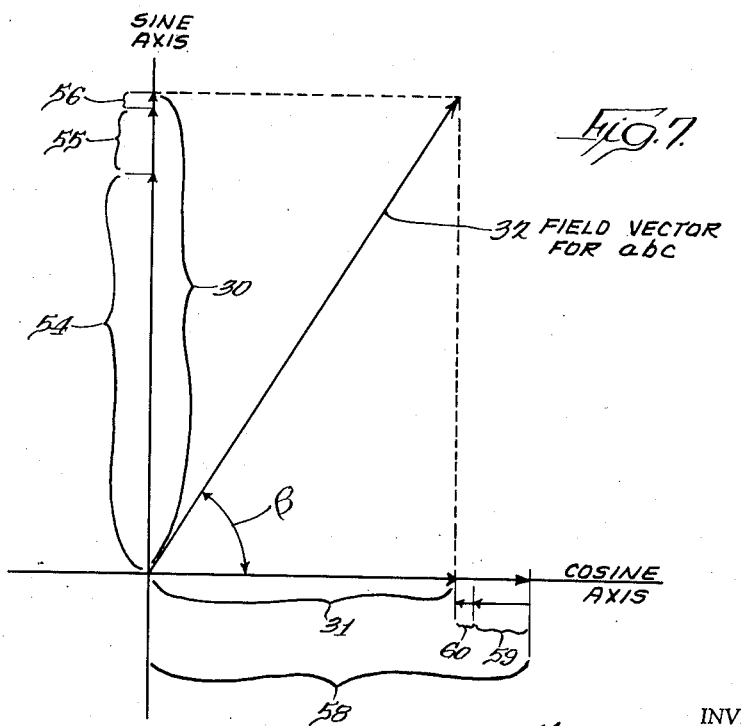
FIG. 7 is a diagram illustrating the algebraic addition of a plurality of voltages to produce sum voltages representing the analog of a three-digit decimal number.

Before treating the digital-to-analog converter 16 in detail, it will be helpful to review the construction and operation of a typical synchro device 21, such as that shown as a resolver in FIG. 2. This resolver has two stator windings 21a, 21b which are physically spaced to produce fields physically separated by 90°. Two A.C. voltages of the same frequency and of the same or opposite phase applied to these windings will produce a magnetic field at a particular angle which depends upon the relative magnitudes of such voltages. For example, as shown in FIG. 7, if the first stator winding 21a is supplied with an A.C. voltage having a magnitude represented by the vector 30, and if the other stator winding 21b is supplied with a voltage having a magnitude represented by the vector 31, when the two are added vectorially they will produce an internal field vector 32 disposed at a particular angle $\beta$ relative to a reference plane within the stator. Because the component voltages supplied to the stator windings 21a, 21b are vectorially combined at 90°, the two windings are conveniently referred to as the sine winding and cosine winding, respectively.

The synchro device or resolver 21 also has a rotor disposed within the stator and connected with the shaft 29. The rotor carries a winding 21c which when moved to different angular positions has voltages of different magnitudes induced therein as a result of the magnetic field produced by the excitation of the stator windings. This induced rotor winding voltage is termed the "error" signal and will be proportional in magnitude to the sine of, and agreeable in phase polarity with, the extent and sense of the angular displacement between the field vector and the axis of the rotor winding. If such angular displacement is substantially less than 90°, the error signal may, for practical purposes, be considered as generally proportional in magnitude to that displacement. Whenever the rotor winding is in alinement with the magnetic field vector, the error signal will be reduced to a null or zero value. Thus, for each relationship between the magnitudes and phase polarities of the two exciting voltages applied to the stator windings 21a, 21b, two unique angular positions, spaced apart by 180°, will be established for the rotor winding 21c at which a zero or null voltage is induced therein.

The problem presented, therefore, is to supply the excitation windings of the synchro device or resolver 21 with exciting voltages so related in magnitude for each value of position represented in numerical, digital form such that the error signal induced in the rotor winding 21c will be reduced to a null value when the movable element 10 has been translated by the power means 24 to a position which corresponds to the decimal number.

The digital-to-analog converter 16 which provides an advantageous solution to that problem is shown in more detail by FIG. 2. The switches A and B are there shown as having four banks of ten contacts adapted to be selectively engaged by wipers A1, A2, A3, A4, and B1, B2, B3, B4 as the shafts 12 and 13 are set to ten different angular positions to represent the values of digits a and b. The switch C is shown as having two banks of ten contacts adapted to be selectively engaged by wipers C1 and C2 as the shaft 14 is set to any one of ten positions representing the value of the digit c. In FIG. 2 the switches A, B and C are shown by way of example as set to the positions representing the decimal number 1.64.

As a first part of the digital-to-analog converter, means are provided to generate or derive two primary A.C. voltages which are predetermined trigonometric functions of an angle related to the highest order digit a. For this purpose, the sine-cosine voltage divider 18 is provided in the form of a transformer having primary winding 35 excited from a suitable A.C. voltage source 17 and having a secondary winding 36 which is non-linearly tapped at eleven points to provide voltages which, when measured from the reference or center tap 38, are proportional in magnitude to the sines and cosines of a predetermined angle $a\alpha$. The angle $\alpha$ in the present instance is 36°, constituting one-tenth of one revolution of the resolver rotor winding 21c. As labeled in FIG. 2, the voltage between the reference, center conductor 38 (here shown as connected to ground) and the two extreme taps numbered 1 and 11 on the secondary winding 36 is assigned a reference magnitude E, the voltage on the tap #11 being indicated as of positive phase, and the voltage on tap #1 being indicated as negative in phase, since voltages of the taps on either side of the center conductor 38 will be of opposite or 180° phase relation.

Figure 3A:
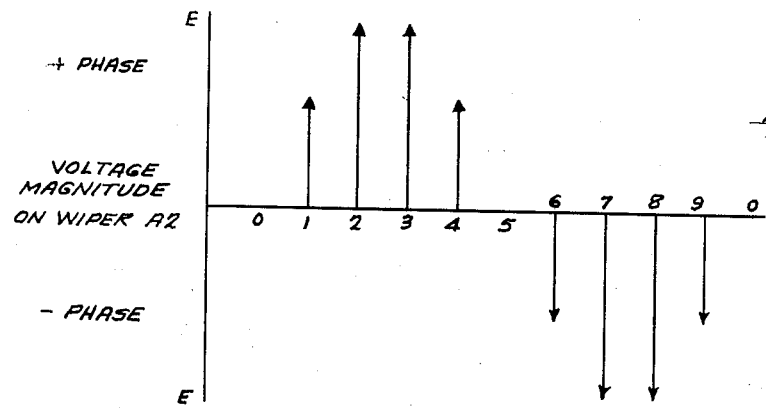
FIGS. 3a and 3b are diagrams showing the relative magnitudes of two primary voltages for different values of the highest order digit of a decimal number.

The ten contact points associated with the switch wiper A2 are connected as shown to the various taps of the secondary winding 36, with the result that as the wiper A2 is moved through its ten successive positions, an A.C. voltage which varies substantially as the sine of the angle $a\alpha$ will be created between the wiper A2 and the point of reference potential here shown as ground. The magnitude of the A.C. voltage appearing on the wiper A2 for each of its angular positions is depicted by FIG. 3a, and is shown to be a substantially sinusoidal variation.

Figure 3B:
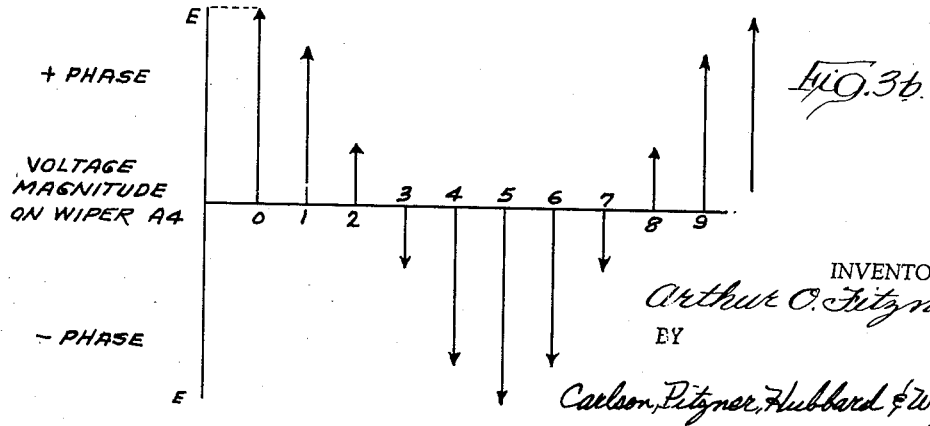

On the other hand, the electrical contacts associated with the switch wiper A4 are connected to the various taps on the secondary winding 36 in the manner shown by FIG. 2, and such that the voltage appearing on the wiper A4 varies (relative to the magnitude of the reference voltage E) as the cosine of $a\alpha$, where $\alpha$ is a predetermined angle, here 36°. This voltage appearing between the wiper A4 and the reference or ground line thus varies in magnitude and phase polarity for each of the positions of the wiper A4 as shown in FIG. 3b.

If the voltages which appear on the wipers A2 and A4 were supplied directly to the sine and cosine windings 21a and 21b of the resolver 21, then as the shaft 12 is moved through the ten positions corresponding to values 0–9 for the digit a, a series of substantially equal field vectors spaced at angles of 36° would be established within the resolver 21, and these would represent the angular position which the rotor winding 21c must assume for a null voltage as the digit a takes on the respective values 0 through 9. These ten field vectors, mutually spaced at 36°, are shown in FIG. 6.

However, it is desirable and necessary to establish field vectors which lie between the ten vectors labeled 0 through 9 in FIG. 6 in order to excite the resolver 21 in accordance with numbers which have different values for the digits b and c. As a first means directed toward this end, provision is made to generate two auxiliary voltages which in magnitude are substantially proportional to $\sin(a+1)\alpha$ and $\cos(a+1)\alpha$, where a is a numerical value between 0 and 9 represented by the setting of the shaft 12. These auxiliary voltages are available from the secondary winding 36 by engagement with a tap one step in advance of the taps engaged by the wipers A2 and A4, respectively. Accordingly, the auxiliary voltages are created on the wipers A1 and A3 through the expedient of connecting the stationary contacts associated therewith to the taps of the transformer 36 such that the wipers A1 and A3 will always connect with that tap which will next be engaged by the wipers A2 and A4, respectively, as the switch shaft 12 is advanced one step. For example, the wiper A2 is here shown as connected to the stationary contact 1, which, in turn, is connected to the #8 tap of the secondary winding 36. When the wiper A2 is advanced one step to the contact 2, it will be electrically connected to tap #10 on the secondary winding. Thus, the stationary contact for $a=1$ associated with the wiper A1 is connected directly to the tap #10 on the secondary winding 36 so that when the wiper A1 is in the "1" position, it actually receives a voltage which is proportional to $\sin(a+1)\alpha$, i.e. $\sin 2 \times 36°$.

Referring to FIG. 3a, as the switch A is set to any of the ten positions there shown as representing the value of the digit a, the wiper A2 will receive a voltage, relative to ground, which is of a magnitude represented by the line corresponding to that position. The wiper A1 will, however, receive a voltage related in magnitude to the line shown for the next succeeding position, i.e., corresponding to a digit value $(a+1)$.

The foregoing explanation with reference to wipers A1 and A2 applies also to wipers A3 and A4. As the wipers are moved through ten successive positions, the wiper A3 will be electrically connected to that tap of the secondary winding 36 which will next be engaged by the wiper A4. Thus, when the wiper A4 is engaged with its #1 contact, it will be electrically connected with the transformer tap #9, while the wiper A3 will be connected with the transformer tap #7. For any position of the wipers A3 and A4, a voltage will appear on the wiper A4 as depicted by FIG. 3b, while a voltage will appear on the wiper A3 which corresponds to the next succeeding position in FIG. 3b. Thus, while the voltage appearing on the wiper A4 is substantially proportional in magnitude to $\cos a\alpha$, the voltage appearing on the wiper A3 is substantially proportional to $\cos(a+1)\alpha$.

Further in accordance with the invention, provision is made to derive two different voltages which are substantially proportional in magnitude to the algebraic difference of the voltages appearing on the wipers A1, A2, and A3, A4. For this purpose, suitable impedances are connected directly across the wipers A1, A2 and the wipers A3, A4, respectively. Such impedances are here shown as autotransformers 40 and 41 which serve as voltage dividers. It will be understood, however, that other impedances such as resistors could be employed, the autotransformers being preferred because they are essentially inductive reactances which create very little power loss.

It will be apparent that with the wipers A1, A2, electrically connected to the opposite extremities of the autotransformer 40, the voltage on the zero tap of the autotransformer will be of a magnitude, relative to ground, substantially proportional to $\sin a\alpha$. In like manner, the voltage applied to the #10 tap of the autotransformer 40 will be substantially proportional in magnitude to the $\sin (a+1)\alpha$. The net voltage across the entire autotransformer, therefore, will always be the algebraic difference of these two voltages, and thus will be substantially proportional in magnitude to $[\sin (a+1)\alpha - \sin a\alpha]$. This will be apparent from FIG. 6 where the field vector 1 (at 36°) corresponding to the digit $a$ with a value of 1 has a sine component represented in magnitude by the vector 44. On the other hand, the field vector 2 (at 72°) corresponding to the highest order digit $a$ with a value of 2 has a sine component corresponding to the longer vector represented at 45. If now the vector 44 is subtracted from the vector 45, a difference vector represented at 46 will be produced, and this is, in the illustration of FIG. 6, proportional in magnitude to $[\sin 2 \times 36° - \sin 1 \times 36°]$. This is the voltage magnitude which will be applied across the autotransformer 40 when the switch A is in that position corresponding to a value of 1 for the digit $a$.

Figure 4:
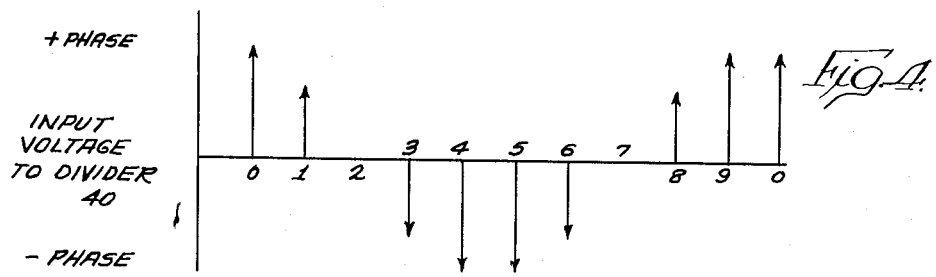
FIG. 4 is a diagram showing the relative magnitudes of a first difference voltage which is produced as the highest order digit of a decimal number takes on different values.

Recognizing that the voltage applied across the autotransformer 40 varies with the position of the switch A in the manner described, the relative magnitudes of the input voltage to the autotransformer 40 for the various positions of switch A are depicted by FIG. 4. It will be seen that the input to the autotransformer 40 not only varies in magnitude but also in phase polarity, representing the algebraic difference of the two absolute voltages, measured relative to ground, which appear on the wipers A1 and A2.

The foregoing explanation with reference to the autotransformer 40 applies equally well to the autotransformer 41 except that because the wipers A3 and A4 receive absolute voltages relative to ground which are proportional in magnitude to $\cos (a+1)\alpha$ and $\cos a\alpha$, the input voltage applied across the autotransformer 41 will have a magnitude substantially proportional to $$[\cos (a+1)\alpha - \cos a\alpha]$$

As a next part of the present digital-to-analog converter, provision is made to derive secondary voltages which are interpolated fractions or parts of the input voltage supplied to the autotransformers 40 and 41, such interpolation being based on the value of the next lower order digit $b$. For this purpose, the autotransformers 40 and 41 are each provided with ten taps as illustrated in FIG. 2, and connections are made to those taps in accordance with the value of the digit $b$ represented by the setting of the switch shaft 13. As here shown, the ten stationary contacts associated with the switch wiper B2 are connected to successive ones of the taps 0 through 9 on the autotransformer 40 so that a larger proportion of the voltage appearing across the transformer 40 will appear between the wipers A2 and B2 as the latter is moved through successive positions.

Figure 5:
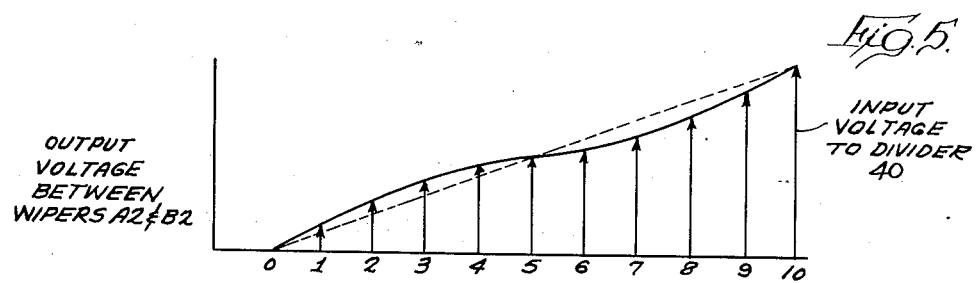
FIG. 5 is a diagram illustrating the relative magnitudes of an output voltage provided by a voltage divider which interpolates on the basis of the value for a lower order decimal digit.

The taps 0 through 10 on the autotransformer 40 are almost, but not quite, linearly spaced. The object here is to provide a series of secondary voltages which when added to the voltage appearing on the wiper A2 will create a total voltage which in magnitude is substantially proportional to the sine component required to produce a field vector at an angle which is proportional to the weighted values of higher and lower order digits $a$ and $b$. Referring to FIG. 6, a chord 47 is shown as drawn between the extremities of the field vectors representing the value of 1 and 2 for the digit $a$. If now the angle between these two field vectors is divided into ten equal parts so as to determine the directions of field vectors necessary to represent angles proportional to values 1.0 through 1.9, then projections of such vectors onto the vertical axis will represent the total sine component voltage necessary to produce those equally spaced field vectors. Since dividing the 36° angle between the field vectors 1 and 2 into ten equal angles of 3.6° does not result in ten equal increments along the chord 47, the ten projections onto the vertical axis are not uniformly spaced apart. Therefore, the taps 0 through 10 on the autotransformer 40 are not quite uniformly spaced, but rather are spaced to provide voltages between the 0 and #10 taps having magnitude relationships depicted in FIG. 5. In this manner, the wiper B2 will pick-off from the autotransformer 40 a voltage appearing between the zero tap thereof (wiper A2) and a particular tap which is dependent upon the value of the digit $b$, which voltage is an interpolation of the difference voltage applied across the autotransformer. The interpolation is not quite linear (FIG. 5), so that sine component voltages for equally spaced field vectors terminating on the chord 47 (FIG. 6) will be produced.

The interpolating autotransformer 41 is also provided with ten taps connected to the respective stationary contacts associated with the switch wiper B4. Moreover, the autotransformer 41 is not quite linearly tapped, but the voltage picked off of the autotransformer between the wipers B2 and B4 will represent an interpolation of the input voltage based on the value of the digit $b$, which corresponds to the position of the wiper B4.

At this point, it should be noted that voltage occurring on the wipers B2 and B4 relative to ground is constituted by the algebraic sum of the voltage appearing on the wipers A2 and A4 and that portion of the difference voltage across the autotransformers 40 and 41 which is picked off by the wipers B2 and B4. Thus, the voltage appearing between the wiper B2 and ground is in magnitude the sum of the two voltages 49 and 50 shown in FIG. 6, while the voltage appearing between the wiper B4 and ground is the algebraic sum of the voltages 51 and 52 shown in FIG. 6. These algebraic sums if added vectorially at 90° will produce a field vector 48 having an angle of 57.6 degrees, i.e., $1 \times 36°$ plus $6 \times 3.6°$. This is the unique angle of the field vector desired for a two digit number $ab$ where $a$ is equal to 1 and $b$ is equal to 6. If these two sum voltages were applied to the resolver windings 21a and 21b, then the rotor 21c would have a null or zero error voltage induced therein only if the rotor were angularly positioned at 57.6° (or 180° therefrom). As thus far described, therefore, the apparatus of FIG. 3 constitutes a digital-to-analog converter capable of handling decimal numbers of two digit places. If the voltages appearing on the wipers B2 and B4 were applied to the stator windings 21a and 21b, one hundred equally spaced null positions for the rotor winding 21c would be established as the decimal number represented by the positions of the switches A and B is changed from 0.0 through 9.9.

It may in some instances be desired to establish one thousand unique angular positions for the rotor winding 21c at which null voltages occur as a three-digit decimal number is varied from 0.00 through 9.99. This is readily accomplished in the present instance through an extension of the interpolating apparatus already described. As a first means toward this end, provision is made to produce two additional auxiliary voltages which in magnitude are interpolations of the above-defined difference voltages based, not on interpolations of the value of the digit $b$, but based on the value of the digit $(b+1)$. For this purpose, the stationary contacts associated with the switch wipers B1 and B3 are electrically connected to the taps of the respective autotransformers 40 and 41 such that those wipers B1 and B3 will always receive a voltage from the next higher tap than that received by the wipers B2 and B4, respectively. In other words, when the shaft 13 for the switch B is at position 6, the wipers B2 and B4 will receive an interpolated voltage from the #6 taps of the autotransformers 40 and 41. However, the wipers B1 and B3 when in the #6 position will receive an interpolated voltage which is one step greater, i.e., will be connected to the #7 taps of the autotransformers 40 and 41. Thus, the wipers B1 and B3 pick-off from the autotransformers 40 and 41 an interpolated voltage based on the value of the digit $(b+1)$.

Further, provision is made to produce two additional difference voltages by algebraically subtracting the two secondary voltages appearing on the wipers B2 and B4 from the respective auxiliary voltages on the wipers B1 and B3. For this purpose, voltage dividers in the form of impedances or autotransformers 50 and 51 have their extremities connected to the wipers B1, B2 and B3, B4. Therefore, the input voltages applied across the interpolating autotransformers 50 and 51 are in magnitude equal to the voltage appearing across one of the ten sections of the autotransformers 40 and 41, and correspond in magnitude to the algebraic difference of voltages appearing on the wipers B1, B2 and B3, B4, respectively.

The autotransformers 50 and 51 are provided with ten equally spaced taps and, in this instance, may be linear voltage dividers. To produce two tertiary voltages which are interpolations of these second difference voltages based on the value of the third digit $c$, the stationary contacts associated with the wipers C1 and C2 are connected to corresponding ones of the taps on the autotransformers 50 and 51. Thus, the wipers C1 and C2 will pick-off between the zero tap of the autotransformers 50 and 51 (i.e., the wipers B2 and B4) a voltage which in magnitude is an interpolated fraction or part of the difference voltage supplied as the input across the autotransformers 50 and 51. If the wipers C1 and C2 are engaged with their #4 contacts, as shown, then four-tenths of the voltage across the autotransformers 50 and 51 will appear between the wipers B2, C1 and B4, C2.

It will be apparent from the connections of FIG. 2 that the primary voltages appearing between ground and the wipers A2 and A4 are algebraically added respectively to the secondary voltages appearing between the wipers A2, B2 and A4, B4, and further algebraically added respectively to the tertiary voltages appearing between the wipers B2, C1 and B4, C2. Thus, the sine and cosine windings 21a and 21b of the resolver 21 receive voltages which are the sums of the primary, secondary, and tertiary voltages established by the settings of the switches A, B and C. Because the autotransformers 50 and 51 perform an interpolation based on the value of the digit $c$, as the switch C is moved through its ten successive positions, it will create tertiary voltages which when added to the primary and secondary voltages cause the sum voltages to be increased or decreased by slight amounts substantially proportional to the value of the digit $c$.

Referring to FIG. 7, this algebraic combination of the primary, secondary, and tertiary voltages is there illustrated. The primary winding appearing between the wiper A1 and ground has a magnitude represented on the vertical axis by the line 54, the secondary voltage appearing between the wiper A2 and the wiper B2 has a magnitude represented by the line 55, and the tertiary voltage appearing between the wiper B2 and C1 has a value represented by the line 56. The sum of these is the voltage applied to the sine winding 21a of the resolver, and is represented by the line 30. The magnitude of the line 54 is substantially proportional to $\sin a\alpha$, while the magnitude of the line 55 is an interpolation based on the value of the digit $b$ of $[\sin(a+1)\alpha - \sin a\alpha]$. The magnitude of the line 56 is an interpolation based on the value of the digit $c$ of the difference between the value of the secondary voltage for the digit $b$ and the value for the digit $b+1$.

In like manner, the primary, secondary, and tertiary voltages for exciting the cosine winding 21b are algebraically combined, recognizing that a difference in phase polarity exists. The line 58 (FIG. 7) represents the magnitude of primary voltage appearing between the wiper A4 and ground, the line 59 (which must be subtracted as the result of algebraic summation) represents the magnitude of the voltage appearing between the wipers A4 and B4, and the line 60 represents the magnitude of the interpolated voltage appearing between the wipers B4 and C2. The algebraic sum of these three voltages is represented by the line 31 and constitutes the magnitude of the voltage applied to the cosine winding 21b.

If these sum voltages 30 and 31 are resolved or combined at 90° they will produce a field vector 32 at a particular angle $\beta$ which corresponds to a three-digit decimal number $a$, $b$, $c$, where the value of the digit $a$ is multiplied by 36°, the value of the digit $b$ multiplied by 3.6°, and the value of the digit $c$ multiplied by .36°, and the result added to obtain the angle $\beta$. In this manner, therefore, numerical information digitally represented in decimal form is converted into analog voltage signals which when applied to a resolver or any similar device will produce one-thousand unique angular positions for the rotor winding 21c at which null voltages are induced as the three-digit number is varied from 0.00 through 9.99.

The present digital-to-analog converter is of very simple construction, involving only the use of tapped impedances or autotransformers together with stepping switches or other ten-state devices which can select and add the various voltages produced. While the field vector which results from combining the sine and cosine vectors within the resolver 21 will not be of precisely uniform amplitude at all angles, the variation will be so slight as to be negligible. The physical angle at which the voltage induced in the rotor winding 21c drops to zero will be accurately established.

The operation of the positioning system in FIG. 1 will now be better understood. The settings of the switches A, B, and C in FIG. 1 determine the particular magnitudes of voltages produced in and added by the dividers 18–20 and supplied to the synchro device 21. For any three-digit decimal number between 0.00 and 9.99 the synchro device 21 will produce an error signal until its rotor is turned to a unique null position. Therefore, for any decimal number represented by the setting of switches A, B, C, an error signal will be supplied to the discriminator 22 and the latter will activate the power means 24 to drive the lead screw 25 and shift the element 10 until the shaft 29 has been moved to that unique angular position. Because the synchro device 21 can produce a zero or null error response at two angular positions spaced by 180°, it is preferable to limit the total range of travel of the element 10 such that the shaft 29 cannot make more than one-half revolution.

In many positioning systems, the desired accuracy and range of movement to be accommodated dictates that a plurality of synchro devices be employed, such devices being geared with different ratios to the movable element and excited with analog signals representing progressively lower orders of numerical information. When the error signals from all synchros are simultaneously zero, then the desired position has been reached, and movement is terminated.

In such systems it has been the practice to "switch" the system from a coarser to a finer data synchro as the desired position is approached, the power means being under control of but a single synchro at any given time. Alternatively, the error signals from several synchros have been "mixed" in non-linear circuits so that only the one with the largest error exerts an appreciable effect in controlling the system. Both the "switching" and "mixing" arrangements are complex and costly.

Referring now to FIG. 8, the positioning system there shown employs coarse, medium, and fine synchros 60, 61, 62 each of which is drivingly connected to the controlled moveable element 64 through different ratio gear means 65, 66, and 67. In the present instance, the moveable element 64 is shown as rigidly connected with a nut 64a engaged with a lead screw 68 adapted to be driven from a motor 69 alternatively in a forward direction through a first clutch 70 or in a reverse direction through a second clutch 71. These clutches are selectively engaged in response to energization of associated forward and reverse clutch solenoids F and R. The lead screw 68 may be quickly stopped upon engagement of a suitable braking device 72 in response to energization of an associated braking coil BR. The movable element 64 is intended to be accurately positioned with reference to a stationary scale 74 according to numerical information digitally represented in decimal form.

The coarse synchro 60 is drivingly connected to the lead screw 68 by the gear means 65 such that its rotor turns at a rate of one revolution per ten inches of travel of the element 64. On the other hand, the rotors of the medium and fine synchro devices 61 and 62 are drivingly connected to the lead screw 68 through the gear means 66 and 67 such that they respectively turn at a rate of one revolution per inch and one revolution per 0.1 inch of travel of the element 64.

In order to excite the coarse, medium and fine synchros 60–62 with analog signals corresponding to coarse, medium, and fine portions of numerical data defining the desired position of the movable element 64, digital-to-analog converters of the type previously described are employed. As here shown, a sine-cosine voltage divider 80 is supplied from a suitable A.C. voltage source represented by the terminals T1, T2. To create analog signals representing the desired position according to the two highest order digits of a four-place decimal number, the divider 80 is connected through four banks D1, D2, D3, D4 of a ten-point switch D to a pair of interpolating voltage dividers 81 and 82. The latter cooperate with two contact banks E1 and E2 of a second ten-point switch E to effect an interpolation of the sort previously described in connection with FIG. 2. The sum voltages thus created by the two-digit place digital-to-analog converter are used to excite the stator windings of the coarse synchro device 60.

In a similar manner, the sine-cosine voltage divider 80 is connected through four switch banks E3–E6 to interpolating voltage dividers 84 and 85 leading through decade banks F1 and F2 of a third ten-point switch F to excite the medium synchro device 61. Finally, the sine-cosine voltage divider 80 is connected through four contact banks F3–F6 of the ten-point switch F which lead through interpolating voltage dividers 86 and 87 to ten-point contact banks G1 and G2 of a fourth switch G. The latter lead to the fine synchro device 62.

By this system, three separate, two-place digital-to-analog converters are provided, although all utilize the same sine-cosine voltage divider. The four switches D, E, F and G are set in accordance with the values of a four-place decimal number having descending order digits d, e, f, and g. The coarse synchro device 60 is thus excited with analog voltages representing the desired position of the movable element according to the values of the first two digits d and e. The medium synchro device 61 is similarly excited, but with analog signals representing the digits e and f. The fine synchro device 62 is excited in accordance with the values of the lowest order digits f and g. If, for example, a four-digit number representing the desired position of the element 64 has the value 2.583, then the coarse synchro 60 will produce a null or zero output based on the coarse number 2.5. The synchro devices 61 and 62 will produce repeating null outputs based on the medium and fine numerical values .58 and 0.083. If all of the synchros 60–62 do not simultaneously provide a null indication, then one of the clutch coils F or R must be energized to cause the motor 69 to drive the movable element 64 toward the desired position.

It is to this problem of utilizing the responses of the three synchro devices 60–62 to control the movement of the element 64 that the apparatus illustrated by FIGS. 8–13 is directed.

In accordance with the present invention, each of the synchro devices 60, 61, 62 is connected to supply its error signal to a corresponding one of three discriminators 90, 91 and 92. These discriminators are constructed and arranged to produce a deadband of response and to jointly govern a control circuit 94 which is turn controls the motion of the element 64.

In order to understand the advantageous operation of the system illustrated by FIG. 8, reference should first be made to FIG. 9 wherein the details of one of the three discriminators 90–92 are shown. Since the three discriminators are substantially identical in detail, FIG. 9 will suffice to illustrate the organization of all three.

Referring now to FIG. 9, the discriminator there shown is characterized by the fact that it can provide a "deadband" response which signals when the error signal from an associated synchro device is within a predetermined range from an absolute null or zero value. The rotor winding of the associated synchro device is connected to two input terminals 100, 101, the latter terminal being shown as connected to a point of reference potential or ground. The error signal supplied by the synchro device to the terminals 100, 101 will be of an amplitude which is substantially proportional to the sine of the angular displacement of the synchro rotor from a null position, and will be of one phase or the other according to the sense of that displacement. It will be assumed that if the synchro output signal is in phase with the A.C. voltage used to excite the sine-cosine voltage divider 80 (FIG. 8), then the angular error is such that the movable element 64 must be driven in a forward direction to reduce that error to zero. On the other hand, if the synchro output signal supplied to the terminals 100, 101 is in phase opposition to the A.C. voltage source which excites the sine-cosine voltage divider 80, then the movable element 64 must be driven in a reverse direction in order to reduce the error to zero.

The deadband discriminator of FIG. 9 includes a first stage of amplification, here comprising a controlled discharge device in the form of a vacuum tube pentode 104. Its anode 104a is connected to a source of positive D.C. voltage through a load resistor 105, and its cathode 104b is connected through a self-biasing circuit 106 to ground. The screen grid 104c is held at an appropriate potential by a voltage divider 107, 108. The error signal applied to the terminals 100, 101 is connected through a resistor 109 to the control electrode 104d. The amplified output voltage, corresponding to the A.C. error input on the terminals 100, 101, appears at the anode 104a and is coupled to a phase inverter circuit 111 by a stabilization circuit 112.

The phase inverter circuit 111 is conventional in organization, having two triode discharge devices 110 and 113. The anodes 110a, 113a of the two triodes 110, 113 are connected to the positive voltage source through respective load resistors 114, 115, and the cathodes 110b, 113b are connected through a common resistor 116 to a point of negative potential here shown symbolically as B−. With the control electrode 113c connected to a point of constant potential or ground by a resistor 118, there is direct cathode coupling between the two triodes 110, 113. Therefore, as the amplified A.C. input signal is applied to the first control electrode 110c, it appears at the anode 110a as an A.C. signal in phase with the input signal applied to the terminals 100, 101; and appears at the anode 113a 180° out of phase with that input signal.

These two signals corresponding in amplitude to the error input signal but displaced relative to one another by 180° are coupled to the control electrodes 120a and 121a of two thyratron discharge devices 120 and 121, respectively. The anodes of these thyratrons are connected through relay coils P and M to the ungrounded side or terminal T1 of the same A.C. voltage source shown as supplying the sine-cosine voltage divider 80 in FIG. 8. The control electrodes 120a, 121a of the two tryratrons are normally held considerably below the firing potential by resistors 122, 123 connected to a biasing voltage divider 124.

It will be noted that the thyratrons 120, 121 are controlled discharge devices normally biased below cut-off, each one, however, being excited by an A.C. signal which is proportional in amplitude to the error signal applied to the input terminals 100, 101. The anodes of these thyratrons are supplied with the same A.C. voltage, but their control electrodes receive two A.C. voltages which are of respectively opposite phase and which will shift phase as the error of the controlling synchro becomes positive or negative in sense. If, for example, the error signal is of relatively high amplitude and in phase with the A.C. source voltage applied to the anodes of the thyratrons, then the thyratron 120 will fire and conduct current during a portion of each voltage cycle. Accordingly, the relay P will be energized under these conditions. If, however, the error is of the opposite sense, then the voltage applied to the control electrode 120a will be out of phase with the A.C. source voltage and the voltage applied to the control electrode 121a will be in phase therewith. Accordingly, the thyratron 121 will fire during a portion of each voltage cycle, and the relay M will be energized. If, in either case, the error signal is reduced to a certain predetermined value, then even though one of the control electrodes 120a or 121a receives an A.C. input signal which is in phase with the associated anode voltage, the corresponding thyratron will not fire and neither one of the relays P or M will be energized. Under these circumstances, therefore, no output response from the discriminator is produced.

This operation is illustrated in FIG. 10 which shows that as the synchro error signal applied to the input on the terminals 100, 101 increases positively or negatively from zero, both the relay coils P and M remain de-energized. However, when that error signal reaches and exceeds a certain amplitude 130, then the relay P or the relay M will be energized, according to whether the input signal is positive or negative in sense, i.e., of one phase or the opposite phase. There is thus produced a deadband about the absolute zero error signal point in which no response is provided by the discriminator of FIG. 9.

In order to adjust the width of this deadband, a negative feedback connection is established to vary the effective amplification provided by the discharge device 104 and thus the proportionality between the amplitude of the actual input error signal and the amplitude of the A.C. signals supplied to the thyratron control electrodes 120a and 121a. This feedback circuit includes a connection from the anode of the triode 113 (which has an A.C. voltage thereon which is of opposite phase to the input A.C. voltage on the terminals 100, 101) through a coupling capacitor 131 and a potentiometer 132 to ground. The potentiometer has an adjustable wiper 134 connected through a resistor 135 to the control electrode 104d. Thus, the feedback signal applied to the grid 104d effectively subtracts from the error signal supplied to that grid from the terminal 100. By adjusting the wiper 134, the effective amplification of the discharge device 104 is varied and the width of the deadband illustrated in FIG. 10 is adjusted.

FIG. 11 shows an exemplary arrangement of the control circuit 94 of FIG. 8. Recognizing that each of the discriminators 90, 91 and 92 have two relays therein controlled by thyratrons, such relays have been shown in FIG. 11 as P1, M1 for the discriminator 90; P2, M2 for the discriminator 91; and P3, M3 for the discriminator 92. The relays P1, M1 will be respectively energized so long as the error signal supplied from the coarse synchro 60 to the discriminator 90 exceeds a predetermined positive or negative error value. The relays P2, M2 and P3, M3 are correspondingly controlled according to the sense and magnitude of the error signals from the medium and fine synchro devices 61 and 62.

In order that the movable element 64 will be driven toward the desired position until all of the discriminators 90–92 are satisfied, the contacts controlled by the discriminator relays are connected in circuit with the forward and reverse clutch coils F and R and the brake coil BR as shown in FIG. 11. The forward clutch coil F is connected across a suitable voltage source (here represented as B+ and ground) through three paralleled paths respectively containing normally open contatcs P1a; normally open contacts P2a in series with normally closed contacts M1b; and normally open contacts P3a in series with normally closed contacts M2b and M1b. The forward clutch coil F will be energized if the discriminator 90 signifies that there is a positive error of more than a certain predetermined magnitude sensed by the coarse synchro device 60. On the other hand, if the relay P1 is de-energized, then the forward clutch coil F will remain energized if the relay M1 is not actuated and if the relay P2 is actuated to close the contacts P2a, indicating that a positive error is sensed by the medium synchro device 61. If the relay P2 is deactuated, the forward clutch coil F will neverthless be energized, providing that the relay M2 is not actuated, and providing that the relay P3 is actuated to close the contact P3a, indicating that the fine synchro device 62 is creating a positive error signal of more than a predetermined amplitude. If all of the discriminators provide no response so that none of the relays therein are actuated, then the forward clutch coil F will be de-energized.

The reverse clutch coil R is connected and controlled in a manner similar to the clutch coil F except in an opposite sense. The reverse clutch coil R will be energized if the discriminator 90 indicates that a negative error of more than a predetermined magnitude is sensed by the coarse discriminator 60, this result being produced by closure of the normally open contacts M1a. If both of the relays P1 and M1 are de-energized, however, the reverse clutch coil R will still be energized if the medium discriminator 91 has actuated the relay M2 and closed contacts M2a. Finally, even if both the relays M1 and M2 are de-energized, the reverse clutch coil R will be energized if the fine discriminator 92 is receiving a negative error input and closes the relay contacts M3a. When all the discriminators provide no response, then the reversing coil R will be de-energized.

Connected in parallel with the forward and reverse clutch coils are relays 140 and 141, respectively, having normally closed contacts 140a and 141a connected in series with the brake coil BR across the voltage source. Thus, whenever neither the clutch coils F or R is energized, then both of the contacts 140a and 141a will be closed to energize the brake solenoid BR.

The advantages of the deadband discriminators and their relays connected in the simple circuit of FIG. 11 will be more fully understood with further reference to FIGS. 12 and 13. It is assumed that the four switches D, E, F and G (FIG. 8) have been set to the proper positions to present a desired position of 2.583 inches along the scale 74. Let it be assumed that the movable element 64 is near the zero position relative to the scale 74. Thus, the discriminator 90 will receive an input error signal and will cause the relay P1 to be energized. Accordingly, the forward clutch coil F (FIGS. 8 and 11) will be energized by the contacts P1a, and the motor 69 will drive the lead screw 68 to move the element 64 in a forward direction (right in FIG. 8). Because the contacts P1a are closed, the contacts M1a and P1b must be open. Therefore, regardless of whether the contacts P2a, P2b, M2a, M2b, P3a or M3a are opened or closed, only the forward clutch coil F will be energized.

As the movable element 64 advances from the zero position toward the desired position at 2.583 inches, the medium synchro rotor, being geared to the movable element 64 with a ratio of one revolution per inch, will execute several revolutions, and null signals will be sensed by its rotor winding at two angular positions during each revolution. Accordingly, a plurality of null bands 170 (FIG. 12) which result in simultaneous de-energization of both relays P2 and M2 occur as the movable element approaches the desired position. However, these periods during which both the relays P2 and M2 are de-energized have no effect upon changing the energized status of the clutch coil F and the de-energized status of the clutch coil R.

Also, the rotor of the fine synchro 62 will execute ten times as many complete revolutions as the rotor of the medium synchro 61. It will, therefore, produce ten times as many null band responses 171 (FIG. 12) but the pick-up and drop-out of the relays P3 and M3 can have no effect on the energized and de-energized states of the clutch coils F and R.

When the movable element 64 comes within a predetermined distance of the desired position, the error signal from the coarse synchro 60 will be reduced to such a small value that the relay P1 in the discriminator 90 will be de-energized. As shown in FIG. 12, the band width of the discriminator 90 is set so that the relay P1 will drop out as the movable element 64 comes within 0.2 inch of the final desired position. However, at this instant the discriminator 91 will be receiving a relatively high amplitude, positive-sense error signal and will, therefore, be holding the relay P2 energized. Therefore, when the relay P1 drops out, the clutch coil F remains energized by current flow through the normally closed contacts M1b and the contacts P2a.

Then, as the movable element 64 comes within .02 inch of the desired position, the relay P2 will be deenergized. However, at this instant (FIG. 13) the discriminator 92 will be receiving a positive sense error signal from the fine synchro 62 so that the relay P3 will be energized and the contacts P3a closed. Therefore, the clutch coil F will remain energized, and the clutch coil R will remain deenergized. Not until the error signal from the synchro 62 drops below a predetermined value indicating that the position error is less than one-thousandth of an inch will the relay P3 drop out. With this, the clutch coil F will be deenergized and the contacts 149a closed to energize the brake coil BR. The movable element 64 will come to a stop at exactly the desired position here assumed by way of example to be 2.583.

The same operation such as that just described would take place if it were necessary for the movable element 64 to be moved in a reverse direction in order to reach the desired position.

The deadband discriminators 90, 91 and 92 provide, in effect, a range of error which is treated as if the error had been reduced to zero value. Sensitive zero signal detectors are not required. In the present instance, the deadband for the coarse discriminator 90 extends a distance of 0.2 inch on either side of an exact null point, and this may be easily adjusted by setting the negative feedback potentiometer (see 132, 134 in FIG. 9) in that discriminator. The deadband produced by the medium discriminator 91 is equivalent to 0.02 inch on either side of an exact null position, while the deadband for the fine discriminator 92 is in effect ±.001 inch wide. Thus, if the fine synchro device 62 receives numerical input information corresponding to digits 0.083, when it receives a signal which indicates that the error has been reduced to the nearest thousandth of an inch called for by the numerical data, the motion of the movable element is immediately terminated.

By providing these deadbands the need to accurately sense the magnitude of the synchro error signals is eliminated. The three discriminators are all selectively placed in controlling relation to the power means which effect movement of the positionable element 64. And yet, because the deadbands for the discriminators 90 and 91 are adjustable so that they do not embrace more than one deadband for the respective discriminators 91 and 92, there can be no stoppage of the movable element at a position which does not agree with the original decimal number input data. Setting of the switches D and E effectively shifts the position of the deadband 90a produced by the discriminator 90 along the scale of FIG. 12. Similarly, setting of the switches E and F (FIG. 8) effectively shifts the several deadbands 170 produced by the medium discriminator 91 along the position scale of FIG. 12, while setting of the switches E and G (FIG. 8) effectively shifts by slight amounts all of the deadbands 171 along the position scale of FIG. 12. In this manner, the co-alinement of all three deadbands is made to define a particular desired position at which motion of the movable machine tool element will be terminated. However, there is no requirement that all of the synchro devices be exactly at a null position before movement of the element will be terminated, and thus there is no need for extreme precision in the gearing connections to the coarse and medium synchro devices.

I claim as my invention:

1. Apparatus for converting a decimal number with descending order digits $a$ and $b$ into signals representing the analog of the number, said apparatus comprising, in combination, means for generating two primary voltages which are trigonometric functions of an angle related to the digit $a$, said voltages being of magnitudes such that vector combination thereof produces a vector signal of generally constant magnitude and at an angle which is proportional to the digit $a$, means for generating two auxiliary voltages which are the same trigonometric functions of an angle related to the digit $(a+1)$, means for deriving from each auxiliary voltage and the corresponding primary voltage a secondary voltage which in magnitude is an interpolation based on the digit $b$ of the difference between such auxiliary and primary voltages, means for algebraically adding each primary voltage and the corresponding secondary voltage to produce two sum voltages which are the components of a vector signal of generally constant magnitude and having an angle which is substantially proportional to the number $ab$.

2. Apparatus for converting a decimal number with descending order digits $a$ and $b$ into corresponding analog form, said apparatus comprising, in combination, means for generating two primary voltages which in magnitude are trigonometric functions of an angle linearly related to the value of the digit $a$, means for generating two auxiliary voltages which are the same trigonometric functions of an angle linearly related to the value of a digit $(a+1)$, means for algebraically subtracting from each last-named auxiliary voltage the corresponding primary voltage to derive two difference voltages, means for deriving from said difference voltages two secondary voltages which are interpolated parts of the respective difference voltages related in magnitude to the digit $b$, and means for algebraically adding each primary voltage to the corresponding secondary voltage to obtain two sum voltages which are vector components of a vector signal having generally constant magnitude and an angle which is substantially proportional to the decimal number $ab$.

3. Apparatus for converting a decimal number with descending order digits *a*, *b*, *c* into signals representing the number in analog form, said apparatus comprising, in combination, means for generating two primary voltages which in magnitude are trigonometric functions of angles related in size to the value of the digit *a*, means for producing two secondary voltages which are in magnitude interpolations based on the value of the digit *b* of the algebraic difference of primary voltages for digit values $(a+1)$ and *a*, means for producing two tertiary voltages which are in magnitude interpolations based on the value of the digit *c* of the algebraic difference of said secondary voltages for digit values $(b+1)$ and *b*, and means for algebraically adding the corersponding ones of said primary, secondary and tertiary voltages based on the digits *a*, *b* and *c* to produce two sum voltages which when vectorially combined produce a vector signal of substantially uniform magnitude and having an angle proportional to the number *abc* for all values of digits *a*, *b*, and *c*.

4. Apparatus for converting a decimal number with descending order digits *a* and *b* into signals representing the analog of the number, said apparatus comprising, in combination, means for generating two primary A.C. voltages which in magnitude are substantially proportional to sin $a\alpha$ and cos $a\alpha$, where $\alpha$ is a predetermined angle, means for generating two auxiliary voltages substantially proportional in magnitude to sin $(a+1)\alpha$ and cos $(a+1)\alpha$, means for algebraically subtracting each primary voltage from the corresponding one of said last-named auxiliary voltages to derive two difference voltages proportional in magnitude to [sin $(a+1)\alpha$−sin $a\alpha$] and [cos $a+1)\alpha$−cos $a\alpha$], means for taking interpolated fractions related to the digit *b* of said last-named difference voltages to derive two secondary voltages, means for algebraically adding each said primary voltage and the corresponding secondary voltage to produce two sum voltages, and means for vectorially combining said sum voltages at 90° to produce a vector signal of substantially uniform magnitude and having an angle substantially proportional to the decimal number *ab* for all values of the digits *a* and *b*.

5. Apparatus for converting a decimal number with descending order digits *a*, *b*, *c* into signals representing the analog of the number, said apparatus comprising in combination, means for generating two primary voltages which in magnitude are substantially proportional to sin $a\alpha$ and cos $a\alpha$, where $\alpha$ is 36°, means for generating two auxiliary voltages substantially proportional in magnitude to sin $(a+1)\alpha$ and cos $(a+1)\alpha$, means for algebraically subtracting said primary voltages from corresponding ones of said auxiliary voltages to produce two difference voltages substantially proportional in magnitude to [sin $(a+1)\alpha$−sin $a\alpha$] and [cos $(a+1)\alpha$−cos $a\alpha$], means for producing two secondary voltages which in magnitude are interpolations based on the value of the digit *b* of the two last-named difference voltages, means for producing two additional auxiliary voltages which in magnitude are interpolations based on the value of the digit $(b+1)$ of the said difference voltages, means for producing two additional difference voltages by algebraically subtracting said two secondary voltages from corresponding ones of said additional auxiliary voltages, means for producing two tertiary voltages which in magnitude are interpolations based on the value of the digit *c* of said additional difference voltages, and means for algebraically adding corresponding ones of said primary, secondary, and tertiary voltages to produce two sum voltages which when vectorially combined at 90° produce a vector signal of substantially constant magnitude at an angle substantially proportional to the number *abc* for any value of the digits *a*, *b*, and *c*.

6. Apparatus for converting a decimal number with descending order digits *a* and *b* into signals representing the analog of the number, said apparatus comprising, in combination, a first voltage divider having taps thereon at voltages relative to a reference point which are proportional in magnitude to two trigonometric functions of a plurality of ten angles $a\alpha$ where *a* is any value from 0 through 9 and $\alpha$ is a predetermined angle, a first ten-state device which represents by its state the value of the digit *a*, said device having first and second means for selectively connecting to said taps according to the state of the device to receive two primary voltages which are proportional in magnitude to and agreeable in sense with trigonometric functions of the angle $a\alpha$, said device having third and fourth means for selectively connecting to said taps according to the state of the device to receive two auxiliary voltages which are proportional in magnitude and agreeable in sense to trigonometric functions of the angle $(a+1)\alpha$, two interpolating voltage dividers connected to be energized by the voltages appearing on said first and third and said second and fourth selective connecting means, said second dividers having taps thereon at voltages which are ten interpolated fractions of the input voltage applied thereto, a second ten-state device which represents by its state the value of the digit *b*, said second ten-state device having first and second means for selectively connecting to the taps of said second dividers according to the state of that device to receive respective secondary voltages which are interpolated fractions of the divider input voltage according to the value of the digit *b*, so that the two voltages appearing between said reference point and said first and second selective means of said second device represent analog vector components of a vector having an angle substantially proportional to the number *ab* as the first and second ten-state devices are set to digitally represent the digits *a* and *b*.

7. Apparatus for converting a decimal number with descending order digits *a* and *b* inso signals representing the analog of the number, said apparatus comprising, in combination, a transformer having a secondary winding with ten taps and a center tap thereon, said ten taps being spaced to provide ten voltages thereon which relative to the center tap are proportional in magnitude to and agreeable in phase polarity with the signs of sin $a\alpha$ and cos $a\alpha$ where $\alpha=36°$, a ten-point switch having first, second, third and fourth wipers settable to ten positions to digitally represent the value of the digit *a*, said wipers having associated stationary contacts connected to said secondary winding taps to receive voltages proportional in magnitude to and of phase polarity agreeable with the signs of sin $(a+1)\alpha$, sin $a\alpha$, cos $(a+1)\alpha$, and cos $a\alpha$, first and second voltage dividers connected at their extremities to said first and second and said third and fourth wipers, respectively, said voltage dividers each having ten taps spaced therealong at increments corresponding to the relative parts of a chord of an arc of 36° divided by lines at ten angles of 3.6°, a second ten-point switch having first and second wipers settable to ten positions to represent digitally the value of the digit *b*, said wipers having associated stationary contacts connected to the taps of said first and second dividers, respectively, so that the two voltages appearing (*a*) between the second and first wipers of the first and second switches, and (*b*) between the fourth and second wipers of the first and second switches, are interpolated portions of the input voltages across such dividers, whereby the voltages appearing between said center tap and said first and second wipers of the second switch are sine and cosine components of a vector disposed at an angle substantially proportional to the number *ab*.

8. In a positioning system having power means for driving a movable element to a desired position, the combination comprising a coarse and a fine synchro device each having input windings adapted to receive signals constituting coarse and fine analog representations of the desired position, said coarse and fine synchros each having a rotary output winding, means mechanically coupling said coarse and fine output windings with respectively lower and higher drive ratios to said movable element, first and second deadband discriminators electrically connected respectively to said coarse and fine output windings, said discriminators each having two load devices and means for respectively actuating the same when the input signal to the discriminator exceeds a predetermined magnitude in a positive or negative sense, respectively, and means for causing said power means to drive said element toward the desired position so long as one of the load devices in said coarse discriminator is actuated regardless of the state of the fine discriminator load devices, and means for causing said power means to drive said element toward the desired position so long as one of the fine discriminator load devices is actuated even though both coarse discriminator load devices are deactuated.

9. In a positioning system having power means for driving a movable element to a desired position, the combination comprising coarse and fine synchro devices having rotor windings geared by respectively lower and higher ratios to the movable element, each of said rotor windings having an error signal induced therein which is reduced to a null value as that winding passes successively through predetermined angular positions, coarse and fine deadband discriminators connected to receive the error signals from respective ones of said rotor windings, said coarse and fine discriminators respectively having coarse and fine relays and means for deactuating said relays when the corresponding error signal is within a predetermined band about the null value, and means including contacts controlled by said relays for causing the power means to drive the movable element toward the desired position so long as the coarse relay is actuated or so long as the fine relay is actuated while the coarse relay is deactuated.

10. For use in a servo system wherein is produced an alternating signal proportional in its amplitude to an error in the system and corresponding in its phase polarity to the sign of the error, a deadband discriminator comprising, in combination, first and second thyratrons each having an anode, cathode and control electrode, first and second relays connected in a series combination respectively with the anode and cathode of said first and second thyratrons, means for connecting each said series combination across an alternating voltage source, means for biasing both said control electrodes to a potential below cut-off, an amplifier having input terminals adapted to receive said alternating signal and including means for applying amplified first and second control signals which are respectively in-phase and out-of-phase with said alternating signal to respective ones of said control electrodes, and means including an adjustable negative feedback connection in said amplifier for varying the gain of the latter, whereby said first and second relays are respectively energized only when the error exceeds a predetermined deadband, determined in width by the adjustment of said feedback connection, in one sense or the other.

11. In a positioning system having power means for driving a movable element to a desired position, the combination comprising coarse and fine synchro devices geared with respectively lower and higher ratios to the movable element, said coarse and fine synchro devices respectively including means for producing coarse and fine error signals which cyclically change in magnitude and pass through null values as the movable element travels, substantially identical coarse and fine discriminators connected respectively to receive said coarse and fine error signals, said discriminators each including positive and negative load devices and means for actuating the same when the received error signal respectively exceeds a predetermined deadband in a negative or positive sense, means for causing said power means to drive said element in a positive direction whenever either said positive load device in either of said discriminators is actuated, means for causing said power means to drive said element in a negative direction whenever either of said negative load devices is actuated, and means for preventing operation of said power means in response to actuation of said positive or negative load devices in said fine discriminator so long as the negative or positive load device in said coarse discriminator is respectively actuated.

12. In a positioning system having power means for driving a movable element to a desired position, the combination comprising coarse and fine synchro devices geared with respectively lower and higher ratios to the movable element, said coarse and fine synchro devices respectively including means for producing a coarse and fine error signal which cyclically change in magnitude and are reduced to a null value as the movable element passes through different positions, coarse and fine deadband discriminators connected to receive respectively said coarse and fine error signals, said coarse discriminator including a coarse positive relay and a coarse negative relay together with means for respectively actuating the same when the received coarse error signal exceeds a predetermined magnitude in a negative or positive sense, said fine discriminator including a fine positive relay and a fine negative relay together with means for respectively actuating the same when the received fine error signal exceeds a predetermined magnitude in a negative or positive sense, forward and reverse electrically energizable devices for selectively causing said power means to drive said movable element in forward and reverse directions, a first circuit for energizing said forward device including normally open contacts of said coarse positive relay, a second circuit for energizing said forward device and including in series normally open contacts of said fine positive relay and normally closed contacts of said coarse negative relay, a first circuit for energizing said reverse device including normally open contacts of said coarse negative relay, and a second circuit for energizing said reverse device including in series normally open contacts of said fine negative relay and normally closed contacts of coarse positive relay.

References Cited in the file of this patent

UNITED STATES PATENTS

| | | |
|---|---|---|
| 2,478,203 | McCoy | Aug. 9, 1949 |
| 2,560,337 | Fouassin | July 10, 1951 |
| 2,614,237 | Goertz | Oct. 14, 1952 |
| 2,798,992 | Adler et al. | July 9, 1957 |
| 2,828,456 | Kamm | Mar. 25, 1958 |